Sept. 4, 1951  A. J. FISET ET AL  2,566,880
AUTOMATIC BATTERY FOR LOOMS
Filed July 20, 1948  5 Sheets-Sheet 3

INVENTOR.
ALPHONSE J. FISET
BY  CARL D. BROWN
ATTORNEY

Patented Sept. 4, 1951

2,566,880

UNITED STATES PATENT OFFICE 2,566,880

AUTOMATIC BATTERY FOR LOOMS

Alphonse J. Fiset, Worcester, and Carl D. Brown, Hopedale, Mass., assignors to Draper Corporation, Hopedale, Mass., a corporation of Maine Application July 20, 1948, Serial No. 39,606

21 Claims. (Cl. 139—247)

This invention pertains to automatic batteries for looms, and more specifically, to improvements in automatic batteries adapted to function with bobbins or other filling supplies fed from a source such as a conveyor system or from a preloaded container one of which may be associated with each loom.

It is a general object of the invention to devise a completely automatic filling replenishing battery which will function to replenish standard fly shuttles with filling wound in more or less the usual manner on bobbins of standard type, and which will also function to effect transfer of filling to a shuttle by employment of a part of the standard transfer mechanism now available on fly shuttle looms.

A further object of the invention is that of devising an improved method and means for finding the thread end on the filling supply automatically and with certainty, and for retaining that found end of filling for a period such as is necessary for the filling to be transferred to the shuttle and for the shuttle to make its first pick so that the thread may become interlocked in the fabric before the said found end is released.

It is a further object of the invention to devise an improved tip finding bunch remover which shall be relatively simple in its construction, positive in its operation, which shall be adapted to function with standard bobbins and to remove a bunch wound above or beyond the termination of the filling package itself, and for which the bobbins need not have special characteristics.

A further object of the invention is that of devising means for retaining the found end of the thread including the finding bunch in a manner such that it cannot be accidentally or unintentionally disengaged or become disengaged due to tension in the filling as the shuttle makes its first pick. Along with this, it is further desired that the means for retaining the found end and tip bunch be so positioned as to cause the filling to be held in a position substantially that at which it should be held for most effective threading of the shuttle incidental to making the first pick.

A further object of the invention is that of providing cutting means for the filling end so that there shall be no accumulation of thread at the battery after a period of time during which several transfers shall have been effected. To this end, additional thread-cutting means is provided, said additional means functioning in timed relation to the usual thread cutters to be found in looms of this type.

Other objects of the invention will become apparent from the following more detailed disclosure.

In fly shuttle looms as constructed at the present time the filling is supplied to the shuttles as needed by automatically functioning transfer mechanism which forms a part of and which is adapted to co-act with a rotary or other battery in which the filling supplies are inserted manually. The insertion of the filling supplies, generally in the form of bobbins containing a length of wound thread, involves inserting each supply in the battery in a particular manner after finding the end thereof and then attaching that found end to a thread holder at the outer end of the battery. This requires considerable manual labor and normally a relatively large number of persons are employed in a weaving mill for the purpose of keeping the batteries of the looms filled. Mechanism for doing away with or substantially decreasing that labor has been suggested heretofore, but so far as applicants are aware, that mechanism has never functioned entirely satisfactorily, and it is a fact that it has not been employed to any extent commercially.

According to the invention of which the following is a more detailed description, the battery is adapted to function from a supply of filling either delivered to it by a conveyor system, or supplied through a hopper or other container previously filled and adapted to be connected to or superimposed upon a bobbin chute or other receiving means forming a part of the automatic battery itself and which, in fact, is adapted to receive bobbins from any source of supply.

Bobbins which have been received in the bobbin chute are controlled by positively actuated means and are delivered in sequence so that there is always a single bobbin or other filling supply in readiness for transfer. That bobbin may have filling wound thereon according to the usual system of forming a weft wound package to be employed in conventional shuttles, or in any other satisfactory manner, and in addition thereto, is to have a finding bunch of yarn, sometimes referred to as a tip finding bunch, the purpose of which is to permit automatically functioning, mechanical means to find the end of the filling, to draw it outwardly from the bobbin or other filling carrier and to control it to be held positively for a sufficient period of time for the transfer to be effected and for the shuttle to make its initial pick through the warp, or longer, so that the filling may become properly interlocked before the filling thread is released. In other words, the basic treatment to which the thread and bobbin are subjected in transfer to the shuttle and during the initial pick through the warp does not differ in any substantial respect from that which is now recognized as standard practice.

Movement for the various parts is taken from the transfer mechanism which is already to be found on the loom. The transferrer and attendant parts are more or less standard, and these are employed to impart motion to the additional devices found necessary to render the battery completely automatic. Upon call for transfer, a latch is moved upwardly into the path of a bunter or other abutment on a movable part, preferably on the reciprocating lay, and at that time other connections impart movement to a thread cutter for severing the end of the filling hanging at the outer part of the battery. Movement is also imparted to a bunch remover for stripping the finding bunch from the end of the bobbin and, in timed relation therewith, moving a second instrument to which the bunch is transferred, outwardly to a holder by which that bunch and found end are received and held.

Other functions which are controlled by and the movement for which is derived from the transferrer mechanism, include a swinging arm by which the leading filling supply is periodically advanced to transfer position after the actual transfer of the preceding supply, this occurring on the upward or return movement of the transferrer mechanism.

The invention will hereinafter be described in greater detail by reference to the accompanying figures of drawing wherein one specific and preferred embodiment of the invention has been illustrated.

Figures 1, 2, 16:
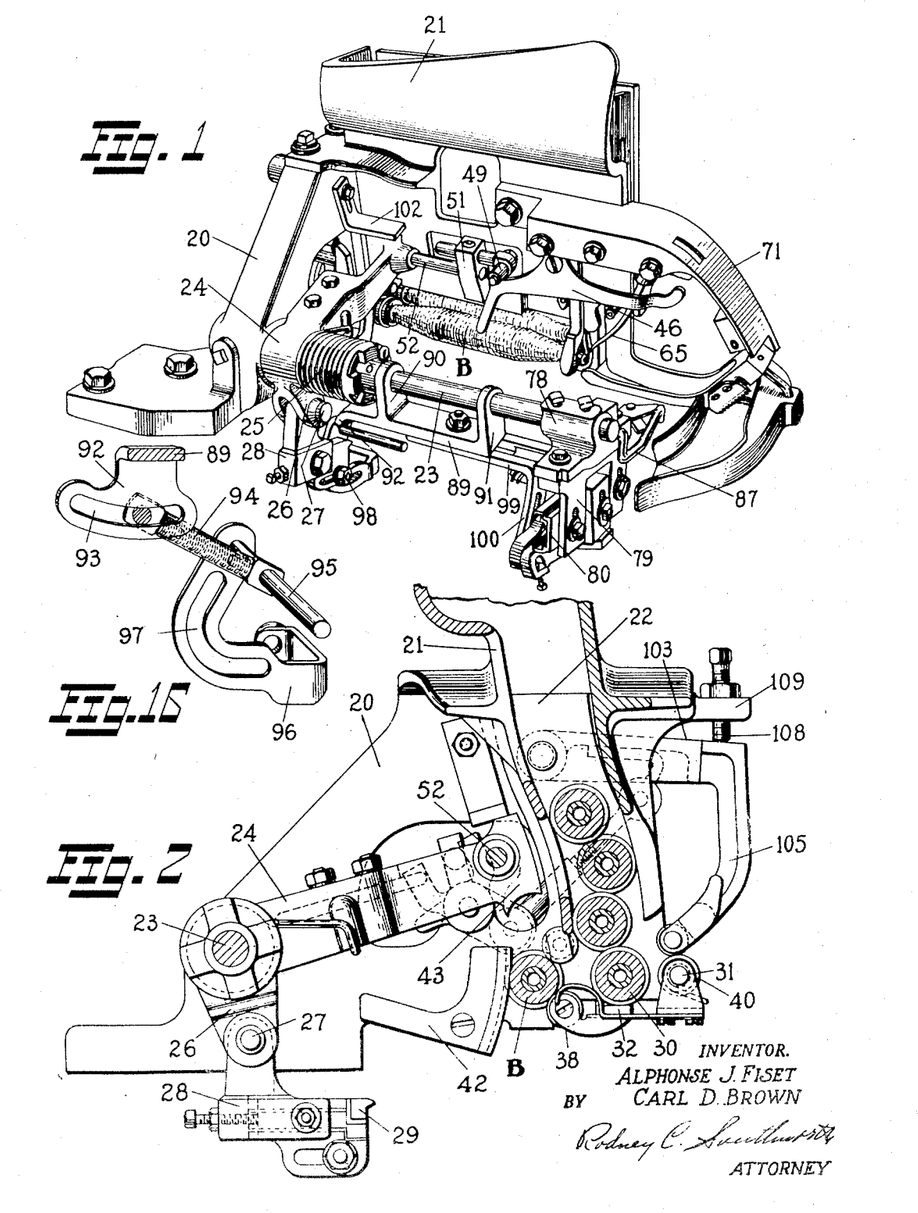
Fig. 1 is a perspective view showing the assembled battery and transferrer mechanism, one filling supply being shown in position just prior to the transfer operation.
Fig. 2 is a section taken vertically through the mechanism illustrated in Fig. 1 and showing the relative position of the chute, a plurality of filling supplies therein, the transferrer arm and the means by which the leading bobbin is moved from the chute to transfer position.
Fig. 16 is perspective detail view of certain interconnecting means by which the thread cutters are operated.

Now referring to Figs. 1 and 2, the entire battery mechanism is supported at the end of a loom being attached thereto by a bracket 20 to which is connected by suitable bolts or other connecting means a chute 21 which has a lower, narrow portion indicated by numeral 22 down and within which pass a plurality of filling supplies which are fed thereto through the upper divergent and wider part of the chute, and to which the said filling supplies are delivered by any convenient means. A conveyor may deliver the filling supplies to the chute upon call therefor through a selective delivery means, or by any other conveying system devised to keep a required minimum of filling supplies in the chute at all times. That conveyor system does not form a part of the present invention and need not be described here in detail.

If desired, a hopper or other container having therein a relatively great number of weft supplies such as might serve the loom for an extended period may be attached above the chute. That container will have been filled with the weft supplies, preferably before applying it to the battery at the loom, and it is to be understood that the supplies or bobbins are to be properly arranged with all ends disposed in a common direction so disposed as to feed into the chute with the butt ends inwardly of the loom as is the common practice. The manner in which the container is constructed and the system by which it may be filled and applied to the loom constitutes a separate problem and the details thereof do not form a part of the present invention.

The bracket 20 supports a transferrer stud 23 upon which is free to pivot the transferrer 24, of more or less common construction, and which is biased in an upward direction by the transferrer spring 25. The transferrer has a downwardly directed, bifurcated arm 26 to which is pivoted at 27 a latch stand 28 having the usual latch finger 29 adapted to contact a bunter or other abutment projecting from a reciprocating member such as the lay, whenever transfer is to be effected. These parts are more or less standard in looms of this type and the details thereof are well established at this time and the function understood by those skilled in the art. A more complete description of the basic manner in which transfer is effected and a fuller showing of parts incidental thereto is to be found in U. S. Patent 2,244,866, so that a further description is not necessary at this point.

Several filling supplies are shown in the restricted portion of the chute 22 and it is to be noted that the lowermost one of these supplies or bobbins indicated by numeral 30 rests upon a bobbin support and guide, part of which is adapted to rock downwardly about pivot 31 at predetermined intervals as will later be described. This support as more clearly shown in Figs. 2-4 and 14, includes a horizontally disposed flat plate 32 which is relatively fixed, and the pivoted parts shown most clearly in Fig. 14 and which comprise a yoke 33 having the upstanding lugs 34 and 35 and horizontally extending projections 36 and 37. The projection 36 carries at its outer end a roller 38 having a plurality of grooves, the function of which will presently be described. The projection 37 is formed with a curved end portion 39 and it is evident, as the parts are viewed in Figs. 2–4, that as the bobbins move downwardly in the chute, the lowermost one thereof stops against the horizontal plate 32 and is laterally maintained between the rear pivot member 31 and the inner roller 38 and the sector 39. A spring 40 always tends to maintain the pivoted or swinging parts in the position of Fig. 2 except when a bobbin is pressed forwardly into the actual transfer position by mechanism hereinafter to be described.

The roller 38 is supplemented by a second and similar roller 41 pivoted to a spindle projecting inwardly from the relatively fixed supporting bracket 29 and a similarly grooved sector 42 also fixed to the bracket 29. The rollers 38 and 41 and the sector 42 form a three point resilient support for the bobbin or other filling supply which is maintained in position for transfer to a shuttle, whenever the filling supply thereof has been depleted. The usual practice is to provide the bobbin butt with a plurality of steel reinforcing rings which also function to position the bobbin and to maintain it in place within the shuttle. The number and spacing of grooves in these elements 38, 41 and 42 corresponds to the number and spacing of rings contemplated at the butt of the bobbins to be employed. A certain amount of adjustment is provided for these parts, and of course, the entire battery mechanism is adjustable in a manner well known to those skilled in the art so that it may be positioned properly for transferring its filling supply to the shuttle as the latter is boxed at the end of the loom lay, it being well understood that alignment of the parts at that time is quite essential.

The transferrer 24 has at its free end a bobbin engaging portion 43, sometimes referred to as the hammer, which is so positioned as to contact the bobbin butt when the transferrer is rotated about its pivot 23. When the transferrer is thus moved, the bobbin which is then held in transfer position, that indicated by the letter B in Figs. 1 and 2, is moved downwardly from the control exercised thereupon by the rollers 38, 41 and the grooved retaining sector 42 until it is held within the retaining clip in the shuttle. At that time the rocking or pivoting retaining member including the roller 38 and the arcuate inner end 39 of the projections 36 and 37 is swung downwardly against the tension of the spring 40 to permit the bobbin B to pass to the shuttle.

The actual movement of the transferrer 24 is confined to a relatively slight angular extent and the downward movement is employed for certain functions while the return or upward movement thereof is used for effecting other functions incidental to actuation of the mechanism. On the downward movement of the transferrer 24 and prior to engagement of the hammer 42 with the bobbin itself, certain other functions must occur. It is to be understood that a bobbin B has already been moved into position in a manner hereinafter more thoroughly to be described. These other functions incidental to the downward movement of the transferrer 24 include movement of a tip bunch remover and the engagement and placement of that tip bunch on a retaining means therefor as will presently be described.

Figure 6:
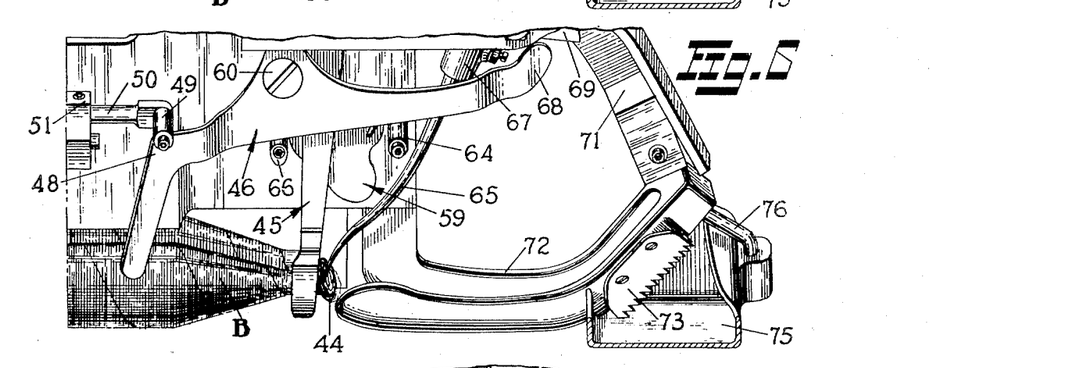
Figure 7:
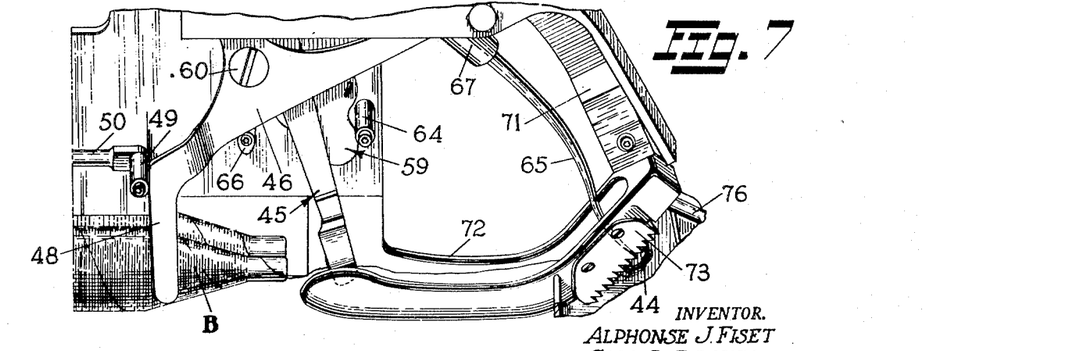
Figures 8, 9, 10, 11, 12, 13:
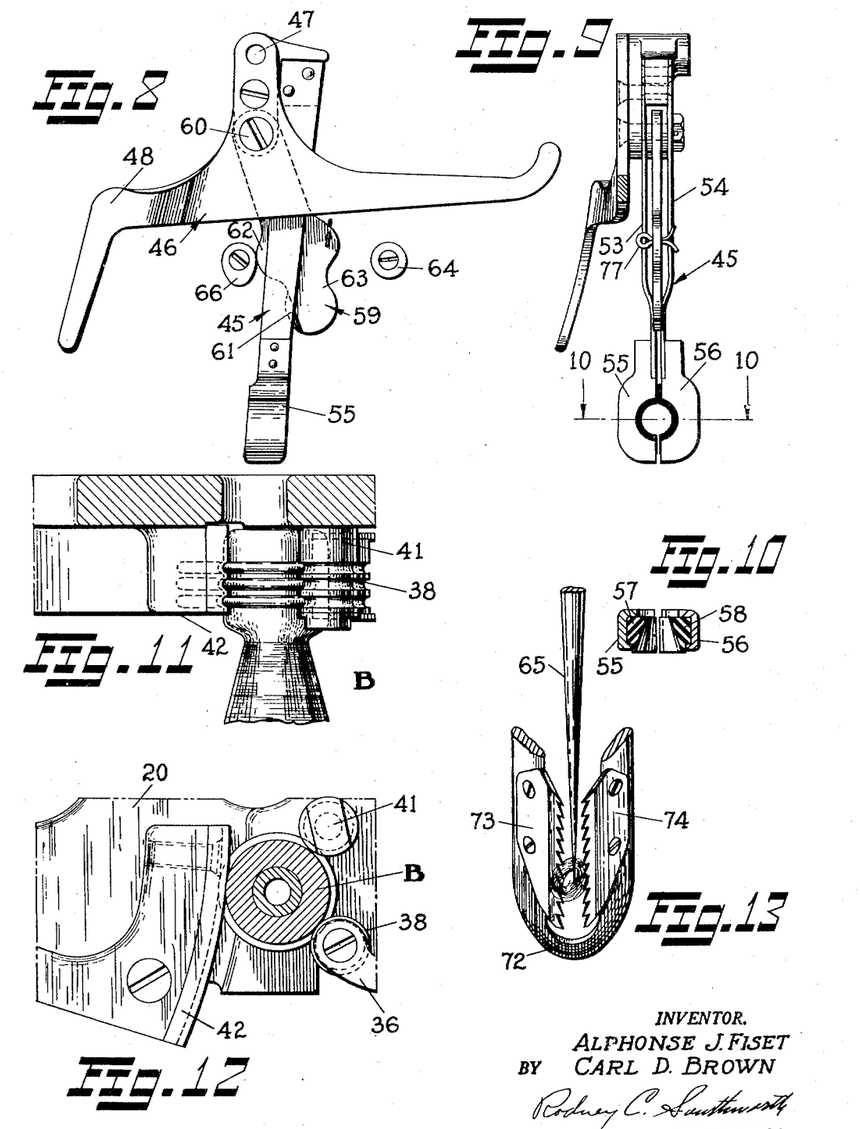
Fig. 8 is a detail view of the bunch remover and attendant parts.
Fig. 9 is a view, one part being shown in section, of the bunch remover of Fig. 8.
Fig. 10 is a section taken at line 10—10, Fig. 9, and showing the manner in which the bunch engaging parts are constructed.
Fig. 11 is a detail view of aligning means by which the butt end of the bobbin is engaged during its movement from the chute to transfer position and by which it is held in proper relationship to the shuttle to which it is to be transferred.
Fig. 12 is a section of the bobbin illustrated in Fig. 11 and showing the three point support provided by the parts involved.
Fig. 13 is a perspective view showing means for retaining the finding bunch after it has been withdrawn from the end of the filling supply.

Now referring to Figs. 5–8 and 9 as well as figures previously involved, a tip bunch designated by numeral 44 is wound at the tip end of the bobbin or other filling support and is spaced slightly from the top end of the actual yarn package itself. This tip bunch, the winding of which is now known to those skilled in the art forms a convenient means by which the end of the yarn may be found mechanically and by which that end may be drawn from the package and extended to a retaining member close to the end of the battery. The mechanical elements which are involved in removing the bunch and in placing it for retention include a bunch remover 45 which is attached to a combined bunch remover actuating lever and pick actuator generally designated by numeral 46. This combined actuator is pivoted at 47, and, as illustrated in Fig. 8, the bunch remover 45 is actually attached as a functionally unitary part of the arm 46. The arm extends inwardly of the mechanism to comprise a cam 48 which is contacted by a cam engaging roller 49 at the end of an adjustable stud 50 retained within a block 51 also adjustably fixed at the end of a second stud 52 which is held within the end of the transferrer 24, and, more specifically, within a bearing just above the hammer 43.

The bunch removing arm 45 is, as shown in Fig. 9, actually constructed in complementary or opposing halves which comprise the spring members 53 and 54 attached by rivets or other suitable means at their uppermost ends. At the lower portions each of these spring members has fixed thereto a bobbin encompassing portion 55 or 56, as the case may be, within each of which is retained a rubber or other stripping member such as the semi-circular elements illustrated in Fig. 10 and designated by the numerals 57 and 58. These strippers are tapered as illustrated and the end at the smaller diameter of the taper is adapted to engage behind the tip finding bunch and to strip it from the small end of the bobbin at the appropriate time.

The opposing halves of the bunch remover tend to spring together under the tension inherent in the side members 53 and 54 and it is desirable to separate the halves as the remover is swung from an outward to an inward position thereby to avoid disturbing the tip bunch 44 at that time. To effect that movement of the parts, a knife member 59 is pivoted at 60 and is interposed between the adjacent inner surfaces of the spring members 53 and 54 at the lower portions thereof where they lie more closely adjacent. This knife member is sharpened at 61 so that it may enter between the spring members and is also provided with cam lobes 62 and 63 which, at appropriate times, are engageable by fixed means adapted to cause the knife member to perform its intended function.

Figure 5:
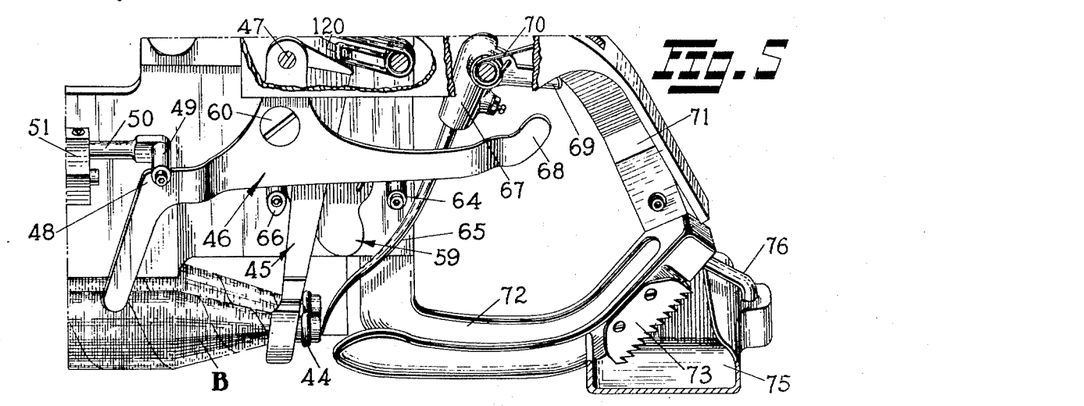
Figs. 5, 6 and 7 are three perspective detail views showing progressive steps in the cycle of stripping a finding bunch from the filling carrier and impaling it upon the holding means by which it is retained until a later point in the cycle.

A projecting contact roll or pin 64 is fixed to the inner or front side of the chute as illustrated more clearly in Figs. 1 and 5, and when the arms 45 and 46 are swung counterclockwise, Fig. 8, the said stop 64 engageable with the cam surface 63 of the knife member, causes the pointed edge 61 thereof to be forced between the opposed spring arms 53 and 54 thereby to separate the two halves of the bunch remover mechanism. Separation thereof is sufficient to cause the rubber bobbin engaging parts 57 and 58 to clear the tip bunch 44 as the bunch remover is swung into the position of Fig. 5, it being understood that when bobbin B is moved forwardly to the transfer position the bunch remover arm 45 and the bunch engaging pick 65 will occupy a position closer to the outer end of the battery and well out of the way of that incoming bobbin.

The inward movement of the bunch remover 45 is of such extent that the actual bunch and bobbin tip engaging parts get behind the tip bunch as shown in Fig. 5 after which the knife is removed so that the rubber elements 57 and 58 are pressed toward the bobbin itself and engage with a light force against the surface thereof.

The latter part of the clockwise movement for the bunch engaging parts causes cam projection 62 to contact the adjustable stop member 66 by which the knife 59 is pushed outwardly from the opposed spring arms 53 and 54 thereby to permit the movement just above described. This stop 66 is formed eccentrically and is also carried at the forward side of a fixed portion of the battery such as the chute, Figs. 1 and 5. By adjustment thereof it is possible to make certain that the bunch remover does not close about the tip of the bobbin until it has reached a position so that the stripper members 57 and 58 must positively engage behind the tip bunch, yet they cannot fail to strip that bunch from the bobbin end when that function becomes necessary.

The pick 65 is held within a combined holder and pivot member 67 pivoted at a point in alignment with the pivot 47, but spaced therefrom. This pick is employed for engaging within the bunch 44 and for moving or drawing that bunch and the thread extending therefrom to the main yarn package outwardly to the position shown in Figs. 7 and 13. When pick 65 is swung to its innermost position, its point aligns with the small end of the bobbin and is in a position as shown in Fig. 6 so that the tip bunch when stripped from the bobbin end is actually more or less centrally engaged by the point of the pick. The entire movement is a relatively rapid one and the timing of parts in such that just as the bunch 44 is stripped from the end of the bobbin and impaled upon the tip of pick 65, that latter member makes a quick swinging movement through approximately 45 degrees, more or less, to the position of Fig. 7.

This pick is operated through the same arm 46 which causes the bunch remover to function, the arm extending forwardly and being offset and curved upwardly as at 68. This end 68 engages beneath a projection 69 which extends outwardly from the pick supporting member 67, it being understood that the pick is normally forced toward its inward position, Fig. 5, by a spring 70, or by any other satisfactory means. There is a certain amount of lost motion or clearance between the end 68 and the projection 69 so that the parts do not contact and the swing of the pick does not commence until the proper timed relationship exists, that is, until the bunch 44 has actually been stripped from the end of the bobbin and is impaled upon the tip of the pick 65.

A bracket 71 extends outwardly of and is attached at its inner end to the chute 21 and carries at its outer end a bifurcated guide member 72 which serves to guide the end of the thread held by certain elements carried on this member 72. It also serves to guard the pick and certain other elements during their movement. These members 71 and 72 also serve as a support for some of the parts carried adjacent the outer end of the battery. Comb members 73 and 74, better shown in Fig. 13, are provided with a plurality of relatively sharp teeth and are angularly disposed as illustrated, so that the tip of the pick 65 is adapted to pass between them and to carry the bunch just removed outwardly after which the return movement of the pick leaves that bunch engaged upon the said teeth. In other words, the bunch may be carried outwardly through the toothed retaining elements, but may not pass in the reverse direction.

The timing of the parts is such that upon call for transfer of a bobbin B which is assumed to be in the transfer position, the downward movement of the transferrer 24 through the cam engaging roller 49 will first move the bunch remover arm to strip the bunch 44 and to impale it upon the point of pick 65. Then the slack having been taken up between the point 68 and the extension 69, further movement of the parts results in swinging the pick to the position of Figs. 7 and 13 and engaging the teeth of elements 73 and 74 with the bunch thereby to hold it and the found end in extended relation to the bobbin about to be transferred. The functions just above described incidental to downward movement of transferrer arm 24 occur before engagement of the hammer 43 with the bobbin structure itself. Further downward movement brings about such engagement, also movement of the bobbin downwardly into the shuttle and driving of the exhausted bobbin outwardly from the shuttle, these latter steps being conventional and well understood by those skilled in the art.

Movement of the bunch remover to its outermost position, Fig. 7, engages the knife cam edge 63 with the stop 64 thereby projecting the knife between the opposed spring arms 53 and 54 to separate the stripper elements and permit the found end to pass downwardly between the separated, opposed halves of the mechanism. That part of the device is then ready for engagement over the end of the next succeeding bobbin and will clear the bunch wound at the tip end thereof.

A small chute 75 is attached by an arm 76 to the bifurcated bracket member 72, or to any other convenient part adjacent the outer end of the battery and serves to guide the bunches and short ends of filling held upon the comb members 73 and 74 into a receptacle (not shown). It is to be understood that the successive movement of the tip bunches outwardly to be held by these comb members causes previously held bunches and the yarn attached thereto which will have been cut as is to be explained hereinafter, to be dislodged from the comb teeth so that there will be no undue accumulation of yarn at that point.

Movement of the knife member 59 between and from the opposed spring members which form a part of the depending bunch remover is controlled in properly timed relationship by the stops 64 and 66 and it is to be understood that normally the movement of these parts cannot become misaligned nor can improper timing occur. In order to prevent accidental movement of the knife member to a too great an extent inwardly between the opposed spring sides of the bunch remover, a stop pin 77 is provided and this stop absolutely prevents entry of the knife beyond a certain predetermined point.

Now referring to Figs. 1 and 15, a cutter for the ends of filling thread which are left hanging from the comb and which would accumulate causing possible difficulties after a period of time will be described. The stud 23 is elongated toward the outer end of the battery and supports a bracket 78 which carries a depending slide holder bracket indicated by numeral 79 and a grooved slide 80. The slide 80 better shown in Fig. 15 has movable therein a cutter support 81, the slide and the support being present in most batteries for the purpose of operating the usual Stafford cutter. Here the movable support 81 has fixed thereto the cutter blades 82 and 83 between which operates a movable cutter element 84 having an operating arm 85 projecting more or less at right angles and adapted on return movements to engage the cooperating edge 86 of one of the depending arms of the bracket 79. A curved cutter operating hook 87 is fixed to the bracket 78 and the angularly bent end 88 thereof engages the actuating arm 85 for the movable cutter blade whenever the cutter support 81 is moved to the dot-and-dash line position, Fig. 15.

For the purpose of moving the sliding support 81 and the cutter just described, a swinging actuator comprising the horizontally disposed member 89, Fig. 1, is pivoted at the stud 23 upon bearings formed adjacent the end of the angularly projecting lugs 90 and 91. A depending portion 92, Fig. 16, is slotted as at 93 to provide for adjustable connection thereto of a short spring link 94, having its opposite end attached to the pin 95 extending from the outer or free end of the curved actuator arm 96 which carries cam slot 97 within which is adapted to function the pin or stud 98 by means of which the latch 29 is raised or otherwise controlled to receive movement from the reciprocating lay whenever the transferrer arm is to be moved for effecting its intended function.

Figure 15:
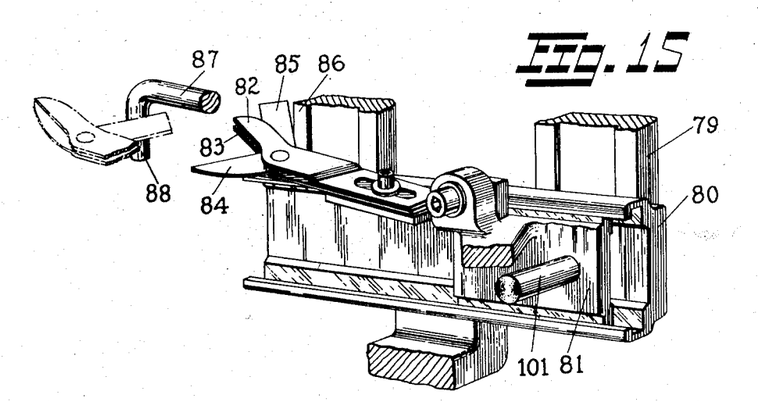
Fig. 15 is a perspective view of the supplemental cutter for the filling end from the previously transferred bobbin.

At the opposite or outer end of the mechanism an adjustable extension 99 conveys movement of the swinging actuator through a depending arm 100 which is slotted for engagement with the pin 101, Fig. 15, projecting inwardly from the cutter-carrying slidable member 81. Thus, whenever there is a call for transfer, the arm 96 moves upwardly in the usual manner and along with the usual function it has of positioning the latch 29, it also, through the mechanism just described, rocks the actuator 89 to push sliding fork 81 along the grooved slide 80 and to project the cutter 82 toward a position beneath the bifurcated guide 72 through a slot at the bottom of which hangs the thread to be cut. It is to be understood that this thread is held by the tip bunch of which it forms an extension and is of considerable length since the opposite end thereof has been cut adjacent the selvage of the fabric by the well-known selvage thread cutter. If these ends are not disposed of, it is evident that there will be an accumulation of tip bunches and attached ends which will after a short time prevent proper operation of the device.

A loose-end clearer (not shown) functions to dispose of the end between the point at which the thread is cut beneath the guide 72 and the fabric selvage, the thread itself being caught by the loose-end clearer which extends beneath it and more or less centrally along its path. As above indicated, the tip bunches and the short ends will either fall from the combs 73 and 74 and will slide down the guide 75 to a receptacle, or if they do not become detached readily, will be pushed therefrom when another tip bunch is moved between the comb members at the following transfer.

Now referring to Figs. 1, 2, 3 and 4, the functions which take place during the return of the transferrer will be described. After the actual transferring of the bobbin B to the shuttle, the parts having reached the end of their possible travel in one direction, the spring 25 tends to return the transferrer arm upwardly to its original position at which it is stopped by the adjustable, angular stop member 102. The lay then moves back permitting the said return movement and the actuator arm 96 returns to its lowermost position so that the thread cutters are moved to the outermost or inactive position, the full line position of Fig. 15 for the auxiliary cutter, and a similar outer position at which the Stafford thread cutter is relatively inactive except for the fact it holds a cut end of filling.

Figure 3:
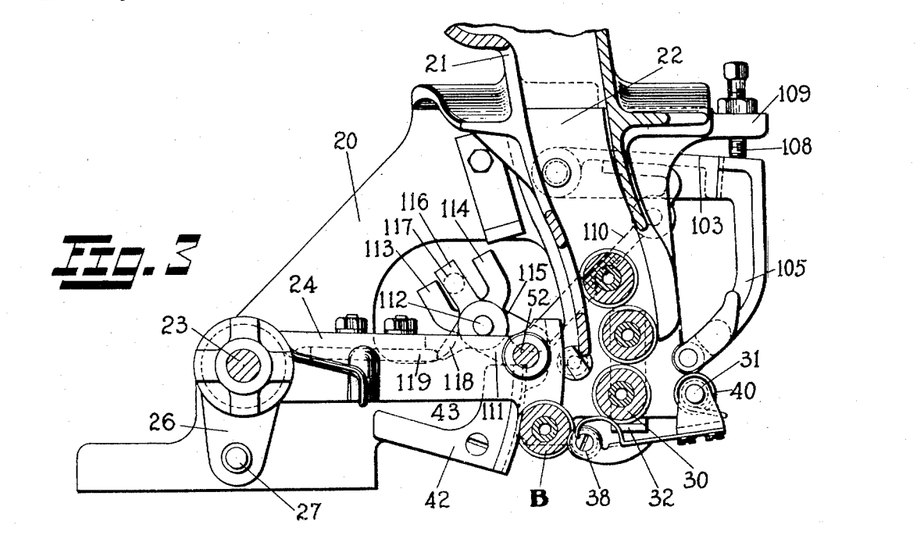
Fig. 3 is a similar section illustrating certain of the parts incidental to the transfer operation in a more advanced position.
Figure 4:
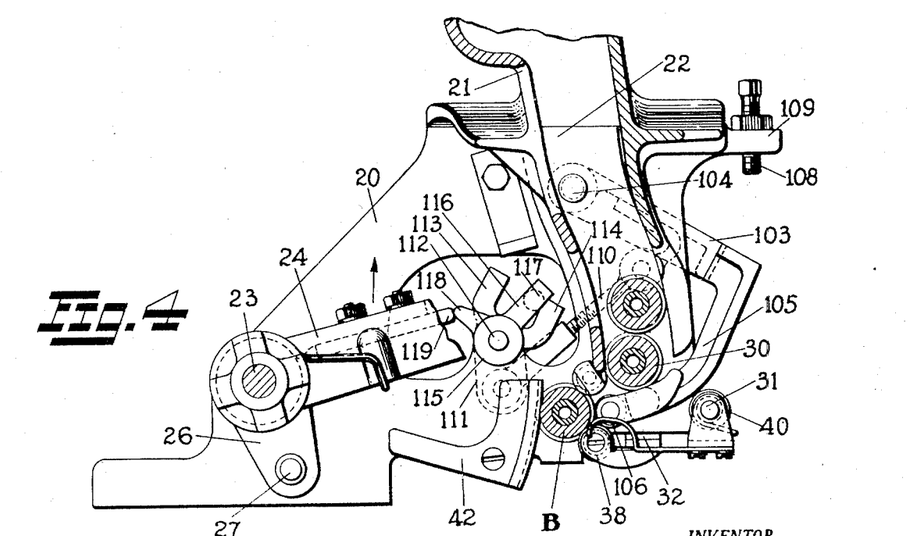
Fig. 4 is a similar sectional view showing the parts after actual transfer has been effected and at the end of the stroke by which the leading filling supply is moved to transfer position.

A number of filling supplies or bobbins as indicated in Figs. 2-4 are always available in the chute 22 and the lowermost one of these, as previously explained, rests upon a fixed plate 32 in readiness for movement to the transfer position as designated by the bobbin to which the letter B is applied. As the transferrer 24 moves upwardly under the influence of spring 25 the mechanism for so advancing the next filling supply is caused to function. That mechanism comprises an angularly shaped arm generally designated by numeral 103 pivoted at 104 and having its curved angularly bent portion 105 provided with a freely rotatable roller 106 which is adapted, as shown in Fig. 4, to engage behind the lowermost bobbin in the chute and which rests upon the plate 32, and to push it more or less horizontally until it engages between the three point support therefor which comprises the spring pressed roller 38, fixed roller 41 and sector 42.

Figure 14:
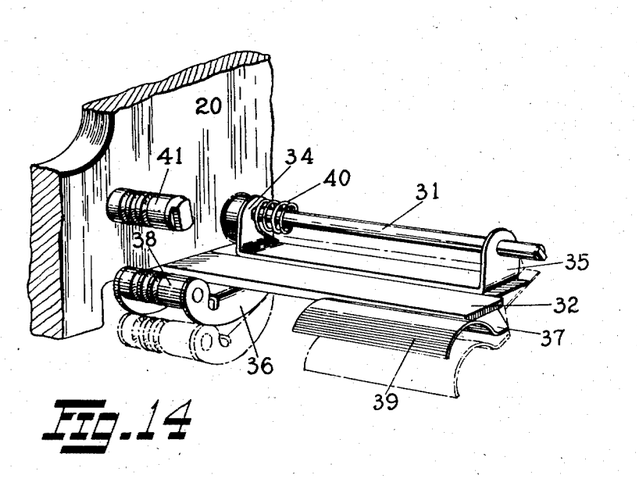
Fig. 14 is a perspective detail view showing the bobbin supporting means positioned beneath the chute.

As the pressure from the moving arm 103 is applied to the lowermost bobbin in the chute, it is forced to the transfer position against the tension of a spring 40, Fig. 14, by means of which the pivoted structure which comprises the arms 36 and 37, roller 38 and the curved bobbin guide 39 are urged upwardly. The said pivoted elements move downwardly and out of the way during passage of the bobbin from one position to the other. After it has been pushed inwardly against the sector 42, the spring 107 which is relatively powerful, moves the roller 38 upwardly so as to complete the three point support. When actual transfer of a bobbin is effected as above described, these pivoted arms 36 and 37 again move downwardly to permit the bobbin B to pass to the shuttle, but at that time there is no pressure upon the lowermost bobbin in the chute and it remains in position until actually contacted by the roller 106 on the arm 103.

To move the arm 103 from its uppermost position at which it is stopped by a stop screw 108 in a lug 109, a link 110 attached at one end to the arm and at its opposite end to an arm 111 of a lever pivoted at the point 112 and extending to the opposite side of the pivot to comprise a forked portion having spaced arms 113 and 114 derives a movement from the transferrer. A spring (not shown) normally maintains the arm 103, link 110 and the forked lever to which the link is connected in the position shown in Figs. 2 and 3. In addition, and as more clearly shown in Fig. 4, a double-armed lever also pivoted at 112 is employed. This double-armed lever has a hub 115, an arm 116 from which projects a pin 117 engageable between the forked ends 113 and 114. This lever also has a short arm 18 which extends more or less at right angles to the arm 116. The arm 118 is adapted to be contacted by a lip 119 fixed to the transferrer and adjustable by means of interconnecting bolts which pass through slots in one of the elements.

The lever which comprises arms 116 and 118 is spring-urged by a spring (not shown), but which is housed within the hub 115 normally tending to move the parts clockwise in Figs. 2–4. That always tends to move the short arm 118 to the uppermost position of Fig. 2. In that position the arm 118 is contacted by the lip 119 as the transferrer is moved downwardly. However, the only effect is that the lever comprising arms 116 and 118 is moved against the tension of its spring from the position of Fig. 2 toward and slightly past the position of Fig. 3, it being understood that the transferrer is not quite at the end of its travel at that point. The parts 118 and 119, when properly adjusted, permit the lip 119 to pass beneath the arm 118 during the latter part of the travel of the transferrer.

When the said lip has passed by the arm 118 the spring then swings the arms 116 and 118 back to the position of Fig. 2 in which the pin 117 engages against the portion 114 of the forked part of the lever by which motion is conveyed through the link to the arm 103. Upon the return or upward movement of the transferrer the slide 119 engages beneath the arm 118 and positively moves it and arm 116 to swing the forked lever including the depending arm 111 as shown in Fig. 4 until the arm 103 moves against the tension of its retaining spring far enough to press the bobbin B to the position it occupies in that figure and from which it may be transferred. The adjustment of lip 119 is such that it slips past arm 118 on the upward portion of the travel of the transferrer just as the arm 103 has been moved sufficiently to snap the bobbin into position between the rollers 38, 41 and the sector 42. After the arm 103 has reached the end of its travel and after the bobbin B has arrived at the transfer point, the parts are released and the springs which govern their return movement are effective to re-establish them in their original positions after which the bobbins in the chute move downwardly until the next in line has assumed a position just above the plate 32 preparatory to the next change at which the same function is repeated.

Now returning to Figs. 1 and 5–9, the upward or return movement of the transferrer releases the downward pressure of the roller 49 at the inner end of the lever 46 and permits the return movement of those parts controlled by that lever. The bunch remover 45 which has been opened or separated upon contact of the knife 59 with the stop 64, moves inwardly under the influence of a spring 129. When the bunch remover has reached the extremity of its travel toward the left, Fig. 5, or slightly before that, the knife is pushed outwardly and disengaged from the arms of the bunch remover due to contact with stop 66. The bobbin-engaging portion of the remover is then permitted to contact and to grip the bobbin tightly behind the bunch 44. Along with the movement of the bunch remover to that position, the picker 65 is returned to its position where the point coincides more or less accurately with the center of the end of the bobbin B which is in transfer position.

The parts are then returned to their initial position at which the cycle may be repeated as often as and whenever a call comes for replenishment of the filling at the shuttle. It is assumed that the supply of bobbins or other filling carriers will be kept at a number where there will always be at least one more bobbin in the chute 22 so that upon transfer and return movement of the transferrer arm, that last bobbin may be pushed into the transfer position and the parts returned to their non-active or starting position and, of course, it is preferable that a greater number of bobbins be maintained in the chute, although the device will operate to transfer right down to the final bobbin available.

*Operation*

Now having described the invention in detail, the following is a short resume of the operation of the device. It is assumed that the bobbin chute is maintained filled with filling supplies or bobbins in any satisfactory manner. When the filling in a shuttle becomes depleted to the point where the detector mechanism indicates a call for transfer, through mechanism not herein shown but which is well known to those skilled in the art, a change of position in certain parts at the battery is effected. In the proper timed relation to movement of other parts, the actuator 96, Fig. 16, is moved about its axis to an upward position where the cam slot 97 therein governs or changes the position of a latch 29, Figs. 1 and 2, so that contact with a reciprocating part such as the lay may, through the said latch and an arm 26 forming a portion of the transferrer, swing the transferrer mechanism about its pivot stud 23, it being understood that a predetermined angular movement thereof in a downwardly direction, and then return from that position to the initial or inactive position, brings about in proper time sequence movement of the various parts as hereinafter briefly described.

Swinging of the actuator 96 to the uppermost position first effects a movement of the cutter to the position indicated in dot-and-dash lines in Fig. 15. A link 94 connected to depending arm 92 of a swinging actuator 89 through mechanism described hereinbefore pushes the sliding cutter carrier 81 from the full line position in which the cutter blade has been opened to the dot-and-dash line position in which it closes to effect severing of the thread, the hooked blade actuator 87 being adjustable to effect cutting at the proper point during that movement.

The cutting of the thread frees that bunch and short end of filling which is held at the comb members 73 and 74 and which served to find the end and retain it when the previously transferred bobbin was moved to the shuttle. That bobbin, now being expended and replaced by a full one will have the thread end which has just emerged from the shed cut by the usual Stafford cutter in a manner known to those skilled in the art. Incidentally, the Stafford cutter functions with and in addition to the cutter 82 and since it is a common part of practically all batteries, has not been illustrated here.

While the initial movement and the first function which occurs is that of cutting the respective thread above mentioned, the transferrer starts its downward movement almost simultaneously therewith and through the roller or follower 49 carried by the transferrer, lever 46 and other parts described hereintofore, the bunch 44 on the bobbin then in transfer position is stripped from the end of the bobbin and impaled upon the point of the picker 65 by means of which it is quickly moved to the comb members 73 and 74 by which it is held during further movement of the transferrer and displacement of the bobbin from the transfer position to the shuttle itself.

It will be observed that practically all functions which occur on the downward movement of the transferrer are of a positive nature, while the return movement is provided by springs, but it is to be understood that, if desired, both movements may be positively produced. During the downward movement of the transferrer the lip 119 moves past or clears the arm 118 of the double-armed lever which serves to actuate the arm 103.

On the return movement of the transferrer, the lip 119 through its contact with the lever 118 causes the arm 103 to move downwardly as previously described and to feed another bobbin into the transfer position. After the lip clears the arm 118, the parts are free to return to their initial position under the influence of springs, or by any other satisfactory means. The spring-pressed elements, the details of which are shown in Fig. 14, function at that time and permit movement of the leading bobbin as described and also serve to retain it in the transfer position once it has been moved there. The bobbins feed downwardly in the chute after return of the arm 103 so that all parts are again in position for repeating the cycle.

It is to be understood that the disclosure herein given pertains to one particular form which the invention may take, but variations may be resorted to without departing from the original inventive concept. The automatic battery may be applied to and function with other transferring means and that which is herein used by way of description and which forms the basic device upon which other parts are to an extent dependent, may be varied within relatively wide limits without departing from the spirit of the invention as originally conceived.

While the cutter and certain other parts of the device take one particular form as herein illustrated and described, these may be varied widely so that the device is well adapted to substitution of other specific cutters so long as they operate in the same general manner and function to cut the thread as and when desired during the cycle.

The bobbin chute and divergent hopper which is superimposed thereon constitute only one form which that part of the mechanism may assume. If desired, it may be more advantageous to feed the bobbins toward the transfer position by leading them in a horizontal or in some other direction and variations as to those details are contemplated. The general scheme is to feed or permit the filling supplies or bobbins to be fed into the hopper and chute under the force of gravity, but that may still be varied to the extent that the actual feeding of the supplies may be accomplished through a means which is at least to some extent positive in its nature.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

We claim:

1. For an automatic battery for looms having in combination a support, containing and guiding means for a plurality of filling supplies each of which comprises a main thread package and a tip finding bunch, and a transferrer for expelling said filling supplies in succession from the battery and into a shuttle upon call for replenishment of the filling therein, improved means for finding the end of the main package automatically prior to transfer of the said supply to a shuttle which comprises a pivoted bunch remover movable to engage behind the bunch and means functioning in response to movements of the transferrer for controlling said remover to strip the bunch from the supply, and other means functioning in timed relationship to said remover for taking said tip finding bunch from the remover and for extending it away from the supply and attaching it to a holder by which it is retained until transfer of the supply is completed and the shuttle has again resumed its picking movement.

2. For an automatic battery for looms having in combination a support, containing and guiding means for a plurality of filling supplies each of which comprises a main thread package and a tip finding bunch, and a transferrer for expelling said filling supplies in succession from the battery and projecting them into a shuttle upon call for replenishment of the filling therein, an improved means for removing the tip bunch from the filling supply about to be transferred, said means being interconnected to and deriving its movement from the transferrer thereby to function in timed relationship therewith, said means further functioning to move the tip finding bunch away from the supply and to attach it to holding means in substantial alignment with the supply about to be transferred thereby to retain the bunch and found end until transfer is completed and the shuttle has again resumed its picking movement.

3. For an automatic battery for looms having in combination a support, a containing and guiding means for a plurality of filling supplies which comprises a chute in which said supplies are progressed successively toward a transfer point, each of said supplies comprising a main thread package and a tip finding bunch, a transferrer for expelling said filling supplies in succession from the battery and into a shuttle upon call for replenishment of the filling therein, an improved means functioning during the active transfer movement of said transferrer and deriving its movement therefrom for removing the tip bunch from the filling supply about to be transferred and for moving it away from said supply and attaching it to an independent retaining means in substantial alignment therewith whereby the bunch and found end are retained until transfer of the supply is completed and the shuttle has again resumed its picking movement, and other means deriving its motion from the return movement of said transferrer for advancing the then leading supply in said chute toward the point from which the supply is moved by the transferrer to the shuttle.

4. For an automatic battery for looms having in combination a support, containing and guiding means for a plurality of filling supplies each of which comprises a main thread package and a tip finding bunch, a transferrer for expelling said filling supplies in succession from the battery and into a shuttle upon call for replenishment of filling therein, an improved bunch remover pivoted for swinging movement into engagement with each filling supply and to a position behind the bunch for stripping it from the supply, a picker independently pivoted and movable to a point adjacent the end of the supply for engaging the stripped bunch and extending it to a point removed from the supply and aligned therewith and impaling it upon a holding means at that point, and an operating lever engageable by means connected to and movable with the transferrer, said lever being movable coincidentally with the bunch remover and engageable with the picker after a predetermined angular movement, for thereafter moving both said instrumentalities in unison.

5. For an automatic battery for looms having in combination a support, containing and guiding means for a plurality of filling supplies each of which comprises a main thread package and a tip finding bunch, a transferrer pivoted for swinging movement and having a supply engaging portion in alignment with said supply, said transferrer being movable at predetermined times for expelling said filling supplies in succession from the battery and into a shuttle upon call for replenishment of the filling therein, an improved means for finding the end of the main package automatically prior to transfer of the said supply to a shuttle which comprises a depending, swinging, bunch removing instrumentality having two opposed parts resiliently urged toward each other, said bunch remover being swingable to and from a position for engaging behind the bunch to be removed for stripping it from the supply, a picker and means for mounting said picker for independent movement to and from a position for engaging the stripped bunch and for attaching it to a holder therefor in substantial alignment with the filling supply about to be transferred, and an operating lever pivoted adjacent said bunch remover and adapted to move coincidentally therewith, means forming a functional part of said transferrer and engageable with said lever for imparting movement thereto during the swinging movement of the transferrer, and means forming a part of the bunch remover and comprising an element movable between the resilient portions thereof for separating them preparatory to passage of the end of the remover over the bunch, said means further being movable from between the resilient portions of the remover thereby to permit them to close behind the bunch and to strip it from the package upon reverse movement.

6. For an automatic battery for looms having in combination a support, containing and guiding means for a plurality of filling supplies each of which comprises a main thread package and a tip finding bunch, a transferrer for expelling said filling supplies in succession from the battery and into a shuttle upon call for replenishment of the filling therein, an improved means for finding the end of the main package automatically prior to transfer of the said supply to a shuttle which comprises means for removing the tip bunch from the filling supply and for holding it at a point slightly removed therefrom and in substantial alignment with the supply about to be transferred which means comprises a bunch engaging and stripping instrumentality, a picker separately movable and engageable with the stripped bunch, and opposed, toothed bunch receiving and holding means between which the said picker is movable and by which the bunch of found thread is retained after reverse movement of the said picker, and means for actuating said bunch engaging and stripping instrumentality and picker comprising an operating lever and a projecting follower carried by the filling supply engaging end of the transferrer arm and engageable with said lever for imparting movement thereto.

7. An automatic battery for looms having in combination a support, containing and guiding means for a plurality of filling supplies each of which comprises a main thread package and a tip finding bunch, a transferrer for expelling said filling supplies in succession from the battery and into a shuttle upon call for replenishment of the filling therein, means for removing the tip bunch from the filling supply about to be transferred and for moving it away from said supply and there retaining it until transfer of the supply is completed and the shuttle has again resumed its picking movement, and a cutter movable to a position adjacent the point at which the found end is retained for severing the end of filling thread held thereby and which was found and retained upon transfer of the previous filling supply which has just become exhausted.

8. For an automatic battery for looms in which filling supplies having a main yarn package and a tip finding bunch are transferred to a shuttle upon call for replenishment of filling therein, a tip finding bunch remover and holder comprising a means movable to and from a position at the end of the supply for engaging behind the tip bunch and for stripping it therefrom, supplementary means movable in timed relation to said bunch remover for engaging the bunch after it has been stripped from the supply and holding means co-operating to retain the bunch and found end after said co-operating means has moved it into engagement therewith, and actuating means functioning to impart movement first to the bunch remover for stripping the bunch from the supply and thereafter a movement to the co-operating means for transferring that bunch outwardly toward the said bunch holding and found end retaining means.

9. For an automatic battery for looms adapted to transfer filling bobbins on which are wound a main filling package and a supplementary tip finding bunch spaced from said main package, a bunch remover and found end retainer which comprise a swinging separable means adapted to move behind said bunch and to engage the bunch for stripping it from the end of the bobbin, a picker co-operating therewith and pivoted for independent movement to and from a position where its point makes substantial engagement with the end of the bobbin and to a found end retaining means spaced from and in substantial alignment with said bobbin to be transferred, and a lever pivoted for movement with said bunch remover and adapted after a predetermined movement thereof to engage said picker for imparting motion thereto, said lever further having a cam surface thereon for engagement with a follower movable with a part of the transfer mechanism.

10. A bunch remover which comprises two opposed, resilient stripping members, holders for said members and arms to which said holders are connected and by which they and the stripping members may be moved to and from positions to engage and strip a tip finding bunch from a bobbin, said arms being resilient and adapted to urge the holders and resilient stripping members carried thereby into pressure engagement with the surface of the bobbin, and said resilient stripping members comprising inserts in the holders each of which has a conically formed interior opening the smaller end of which 11. A bunch remover for engaging and stripping a tip finding bunch from a bobbin comprising rubber members, one adapted to engage each side of the bobbin and having a conical bore for engagement with the bobbin, said conical bore being so disposed that the end of smaller diameter engages with the bunch to be stripped, and means for moving said holders and stripping members to and from a position to engage the bunch without contacting the bunch during the engaging movement which comprises resilient means carrying the said holders and pressing them together, a knife member movable between said resilient means, cam abutments on said knife member and stop engageable therewith by one of which the said knife member is projected between the resilient means before movement of the parts to a position to engage the bunch and by the other of which it is withdrawn from that position after said parts have engaged behind the bunch to be stripped.

12. In an automatic battery for looms having in combination a support, a containing and guiding means for a plurality of filling supplies each of which comprises a bobbin on which is wound a main thread package and tip finding bunch, said bobbin further having projections at the butt end thereof by which it is to be positioned in a shuttle to which it is transferred, means for advancing the leading filling supply bobbin in the containing and guiding means out of alignment therewith and to a position for engagement by a transferrer, and guide means comprising grooved retaining supports engageable with the butt of the bobbin at three angularly spaced points.

13. A method of manipulating filling supplies of a type which comprise a main thread package and a tip finding bunch spaced from the main package which comprises the steps of periodically advancing a plurality of filling supplies and moving the leading one of said supplies to a position from which it may be transferred to a shuttle, and before such transfer of each successive supply, mechanically engaging the tip bunch thereof and stripping it from the supply and impaling it upon a member, then moving it by said member to holding and retaining means spaced from and in substantial alignment with the supply to be transferred, thereby to find and retain the filling end preparatory to transfer and the initial pick to be made after transfer.

14. A method of manipulating filling supplies of a type which comprise a bobbin on which is wound a main thread package and a tip finding bunch spaced from the main package which comprises the steps of periodically advancing a plurality of said filling supplies and moving the leading one of said supplies to a position from which it may be transferred to a shuttle, and before such transfer of each successive supply, mechanically engaging the tip bunch thereof, stripping the bunch from the bobbin and transferring it to a member positioned for engaging it upon release from the end of the bobbin, then moving it by said member away from and substantially in a direction axially of the bobbin to a position relatively remote therefrom and in alignment therewith until it is engaged by holding means by which it is retained until the bobbin and main yarn package have been transferred to the shuttle and until the said shuttle to which transfer has been made has completed at least one pick through the warp of the fabric.

15. A method of manipulating filling supplies of a type which comprise a main thread package and a tip finding bunch spaced from the main package which comprises the steps of periodically advancing a plurality of filling supplies and moving the leading one of said supplies to a position out of alignment with the said plurality and from which position it may be transferred to a shuttle, and before such transfer of each successive supply, mechanically engaging the tip bunch thereof, stripping it from the supply and moving it to a position relatively remote from the supply to be transferred and attaching it to a holding means in substantial alignment with the said supply, thereby to find and retain the filling end preparatory to transfer and the initial pick to be made after transfer, and simultaneously with the stripping of the tip bunch and attaching it to said holder, cutting the end of thread previously secured at said holder and which constituted the found end of the package previously transferred.

16. A method of manipulating filling supplies of a type in which a main thread package and a tip finding bunch spaced from said main package are wound on a bobbin, which comprises the steps of periodically advancing a plurality of said filling supplies and moving the leading one thereof out of alignment with the said plurality and into a position from which it may be transferred to a shuttle, and before such transfer of each successive supply, engaging an instrument behind the tip bunch and stripping it from the bobbin transferring the said tip bunch having the found end extending therefrom to a second instrument for conveying the bunch to a position remote from the supply and attaching it temporarily to a holder in substantial alignment with the supply to be transferred, and simultaneously with the stripping of the tip bunch and attaching it to said holder, cutting the end of thread previously secured at said holder and which constituted the found end of the package previously transferred.

17. In an automatic battery for looms, a bobbin chute for receiving and holding a plurality of filling bobbins, a transferrer for engaging and transferring a bobbin from the battery to a shuttle upon call for replenishment of filling in said shuttle, said transferrer being adapted to engage a bobbin to be transferred when that bobbin occupies that position isolated from and offset with respect to the chute and remaining bobbins therein, and means functioning after transfer of that bobbin in said offset position and including a swinging arm normally maintained out of engagement with the said bobbins in the chute but movable upon engagement by the transferrer with certain interconnecting, unidirectionally operable, actuating means for the arm to engage the leading bobbin in the chute and to move it to that said offset position from which it may be transferred upon the next call for replenishment.

18. In an automatic battery for looms, a bobbin chute for receiving and holding a plurality of filling bobbins, a transferrer for engaging and transferring a bobbin from the battery to a shuttle upon call for replenishment of filling in said shuttle, said transferrer being adapted to engage a bobbin to transfer it when that bobbin is offset in position to one side of the said chute, means for holding the bobbin in said offset position comprising a fixed roller, a fixed sector and a movable, resiliently pressed roller, each of said rollers and sector having means forming a part of the surface thereof for engagement with complementary projections on the bobbin for retaining it, and means functioning after transfer of that bobbin in said offset position, to advance the next bobbin in the chute to that position by forcing it from the chute and between the said fixed and resiliently pressed rollers until it is engaged between the said rollers and sector thereby to be held until transfer upon the next call for replenishment.

19. In an automatic battery for looms, a bobbin chute for receiving and holding a plurality of filling bobbins, a transferrer for engaging and transferring a bobbin from the battery to a shuttle upon call for replenishment of filling in said shuttle, said transferrer being adapted to engage a bobbin to transfer it when that bobbin is offset in position to one side of the said chute, means for maintaining the position of said bobbin to be transferred and for preventing its movement from that position to the shuttle, said means comprising three elements for engaging the bobbin, one said element being resiliently pressed into engagement therewith thereby to permit movement of the bobbin from the chute to the said offset position and from that position as it is transferred to the shuttle, and means for pressing the lowermost bobbin in the chute to the said offset position which includes a swinging arm, means carried thereby for engagement with the said bobbin to be transferred and interconnecting means functioning upon contact with the returning transferrer and attached to said arm for moving it in timed relationship to the movements of the transferrer for its intended purpose.

20. In an automatic battery for looms, a bobbin chute, means fixed adjacent the lower portion of said chute against which the lowermost or leading bobbin in the chute is adapted to engage and by which it is retained in position, means adjacent said chute to which the lowermost or leading bobbin is moved and comprising three elements, one of which is resiliently urged into position for retaining the bobbin by engagement with the butt thereof, said resiliently pressed elements being carried by a spring-pressed arm pivoted adjacent the bobbin chute and movable into engagement with the said fixed member for limiting the permissible movement of the said lowermost bobbin in the chute except upon intended movement thereof to the said offset position from which it may be transferred.

21. In an automatic battery for looms, a bobbin chute for receiving and holding a plurality of filling bobbins, a transferrer for engaging and transferring a bobbin from the battery to a shuttle upon call for replenishment of filling in said shuttle, said chute and transferrer being so relatively positioned that the transferrer engages a bobbin which has been displaced from alignment with other bobbins in the chute, and means functioning after transfer of a bobbin, to displace the next succeeding bobbin and to position it in the path of the transferrer which comprises a swinging member for moving that bobbin laterally, resilient means normally maintaining said member in an inactive position, and means in the path of and engageable by a part of said transferrer and interconnected to said swinging arm for moving it to contact and displace a bobbin into transfer position, said means comprising a lost motion device effective in one direction only for imparting movement to parts interconnected thereto.

ALPHONSE J. FISET.
CARL D. BROWN.

REFERENCES CITED

The following references are of record in the file of this patent:

UNITED STATES PATENTS

| Number | Name | Date |
|---|---|---|
| 971,541 | Koechlin | Oct. 4, 1910 |
| 1,060,831 | Elmendorf | May 6, 1913 |
| 1,321,275 | Barrell | Nov. 11, 1919 |
| 1,525,773 | Flett | Feb. 10, 1925 |
| 1,666,735 | Colman | Apr. 17, 1928 |
| 2,463,904 | Peterson | Mar. 8, 1949 |

FOREIGN PATENTS

| Number | Country | Date |
|---|---|---|
| 126,402 | Great Britain | May 15, 1919 |